July 27, 1926.
C. L. ARMSTRONG
1,594,146
TILTING JACK
Filed August 12, 1925
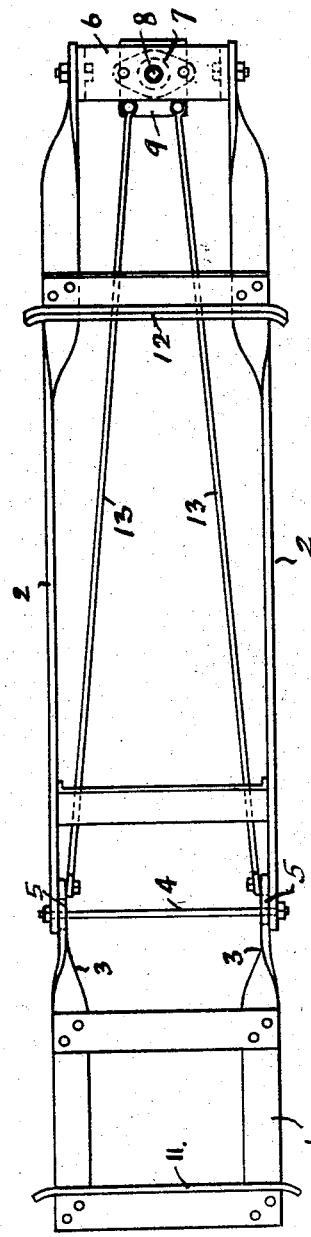
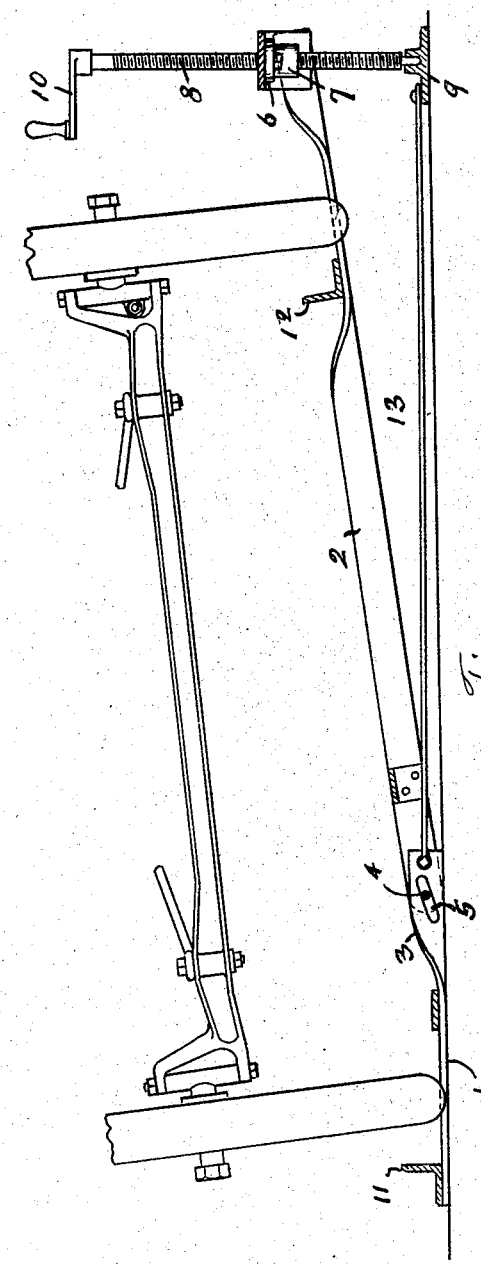
Inventor
Charles L. Armstrong
By Hardway Cathey
Attorney.

Patented July 27, 1926.

1,594,146

UNITED STATES PATENT OFFICE.

CHARLES L. ARMSTRONG, OF HOUSTON, TEXAS.

TILTING JACK.

Application filed August 12, 1925. Serial No. 49,839.

This invention relates to new and useful improvements in a tilting jack.

One object of the invention is to provide an apparatus of the character described specially designed for elevating, or tilting, vehicles, such as automobiles, so that workmen can readily go underneath the vehicle to repair, or work on the same.

Another object of the invention is to provide an apparatus of the character described by means of which a heavy vehicle, such as an automobile may be elevated, so as to render the parts underneath accessible to workmen without bodily elevating the entire vehicle.

A further feature of the invention resides in the provision of a tilting jack, capable of general use, which is of simple construction and which may be easily applied to the work and easily operated.

With the above and other objects in view this invention has particular relation to certain novel features of construction operation and arrangement of parts, an example of which is given in this specification and illustrated in the accompanying drawings, wherein:—

Figure 1 shows a plan view of the apparatus, and

Figure 2 shows the apparatus in section, and as applied to the work.

Referring now more particularly to the drawings, wherein like numerals of references designate similar parts in each of the figures, the numeral 1 designates the foot piece of the jack, which is preferably a rectangular frame structure. Hinged to this foot piece there is a truss-like structure composed of the side members 2—2, suitably secured together in fixed relation. The hinged ends of the side members 2, 2 are connected by a rod 4 which is fitted through the oblong bearings 5, 5 of the lugs 3, 3 carried by the foot piece 1. Pivotally mounted between the outer ends of these side members there is a bracket 6 which carries a block 7 having a vertical tapped hole to receive the jack screw 8. The lower end of this jack screw has a swivelling connection with a supporting plate 9 and its upper end is polygonal to receive a socket wrench, as 10, by means of which it may be turned.

The foot piece 1 has the outer transverse guide 11 whose ends are outwardly curved, said guide being provided to retain one vehicle wheel on the foot piece. The outer end of the truss structure is formed into a rectangular frame-like support for the opposite vehicle wheel, and also has a transverse guide, or retainer 12 to prevent the slippage of the corresponding wheel in case the vehicle is tilted to a considerable angle.

In tilting the vehicle the jack screw is turned to run the truss structure 2, 2, down to a horizontal level with the foot piece 1 and the wheels, at one end of the vehicle, are then run on to the apparatus. The jack screw is then turned in the other direction to elevate one side of the vehicle. If the vehicle is to be tilted up a considerable distance an apparatus should be placed under the rear wheels so that the front and the rear wheels, on one side may be correspondingly elevated.

If desired the apparatus may be placed underneath the vehicle with the foot piece 1 on the ground or floor and with the free end of the truss structure under the middle of the front or rear axle, as desired, and either end of the vehicle thus lifted by operating the jack screw, as described.

The respective lugs 3 are connected to the plate 9, by means of the tie rods 13, 13, so as to anchor said plate securely in position. As the jack screw is operated, to move the outer end of the truss structure 2, 2, up or down, this structure will move lengthwise relative to the lugs 3 so that its free end may move vertically rather than in an arcuate direction.

What I claim is:—

1. A tilting jack including a foot piece adapted to receive a vehicle wheel, a member hinged thereto, and movable vertically and adapted to support the transversely opposite wheel of the vehicle, and a jack screw having operative connection with said member.

2. A tilting jack embodying a foot piece adapted to receive a vehicle wheel, a frame hinged to said foot piece whose free end is formed into a support adapted to receive the transversely opposite wheel of the vehicle, means for elevating and lowering said frame on said hinged connection.

3. A tilting jack embodying a foot piece, a frame hinged to said foot piece and arranged at one side thereof and whose free end is formed into a support, means for elevating and lowering said frame on said hinged connection and a transverse guide on said foot piece.

4. A tilting jack embodying a foot piece, a frame hinged to said foot piece and extending laterally beyond the foot piece and whose free end is formed into a support means for elevating and lowering said frame on said hinged connection, a transverse guide on said foot piece, and a transverse guide on said support.

5. A tilting jack including a foot piece, a truss like frame hinged thereto and whose free end is formed into a support, said foot piece being disposed to simultaneously receive transversely opposite vehicle wheels, a pivotally mounted block carried by said free end and a jack screw having a threaded connection with said block.

6. A tilting jack embodying a wheel receiving foot piece, a frame having a slidable hinged connection therewith and whose free end is formed into a wheel receiving support, means operatively connected to said free end for elevating and lowering said frame relative to said foot piece.

7. A tilting jack embodying a wheel receiving foot piece, a frame having a slidable hinged connection therewith and whose free end is formed into a wheel receiving support, means for elevating and lowering said frame relative to said foot piece and means for maintaining said elevating and lowering means in fixed relation to said foot piece.

8. A tilting jack for tilting vehicles including a foot piece, a frame member hinged to the foot piece and extending laterally therefrom and normally lying in a common plane therewith, the free end of said frame member being formed with a wheel receiving support, and means operatively connected with said free end through which said frame member may be elevated and lowered relative to the foot piece.

In testimony whereof I have signed my name to this specification.

CHARLES L. ARMSTRONG.